United States Patent [19]

Conrad

[11] Patent Number: 5,048,009
[45] Date of Patent: Sep. 10, 1991

[54] BROADCAST STATION LOCATOR FOR A LOCAL AREA NETWORK

[75] Inventor: Michael Conrad, San Jose, Calif.

[73] Assignee: Hewlett-Packard Company, Palo Alto, Calif.

[21] Appl. No.: 317,185

[22] Filed: Feb. 28, 1989

[51] Int. Cl.⁵ .............................................. H04J 3/14
[52] U.S. Cl. ..................................... 370/17; 370/85.1
[58] Field of Search ....................... 370/17, 85.1, 85.9, 370/85.11, 94.1, 110.1; 340/825.49

[56] References Cited

U.S. PATENT DOCUMENTS

| | | | |
|---|---|---|---|
| 3,434,049 | 3/1969 | Frye | 324/52 |
| 3,727,128 | 4/1973 | McFerrin | 324/52 |
| 3,909,712 | 9/1975 | Wolfdletrich Kletz et al. | 324/52 |
| 4,291,204 | 9/1981 | Crick | 179/175.3 |
| 4,404,514 | 9/1983 | Reichert | 324/52 |
| 4,475,079 | 10/1984 | Gale | 324/52 |
| 4,479,228 | 10/1984 | Crane | 375/7 |
| 4,538,103 | 8/1985 | Cappon | 324/52 |
| 4,739,276 | 4/1988 | Graube | 324/534 |
| 4,755,742 | 7/1988 | Agoston et al. | 324/58 |

OTHER PUBLICATIONS

Dono van-Mierop et al., "The 82586 LAN Controller Chip", 1983, pp. 283-296.

Primary Examiner—Douglas W. Olms
Assistant Examiner—Melvin Marcelo

[57] ABSTRACT

Method and apparatus for determining the location of a broadcasting station in a local area network communications system such as Ethernet that is arranged in a bus topology. An echo module, positioned at one end of a cable, receives a packet broadcast by a station and broadcasts a distinctive echo pulse on the cable during the interframe gap or at another chosen time. A processor module positioned at a second end of the cable receives the originally broadcast packet and the echo pulse, notes the times of receipt $t_1$ and $t_2$, respectively, of these signals, and determines the temporal distance $T_1$ from the broadcasting station to the echo module by the equation $$T_1 = (t_2 - t_1 - \Delta t_{dp})/2,$$

where $\Delta t_{dp}$ is a time delay associated with validation of the echo pulse.

25 Claims, 8 Drawing Sheets

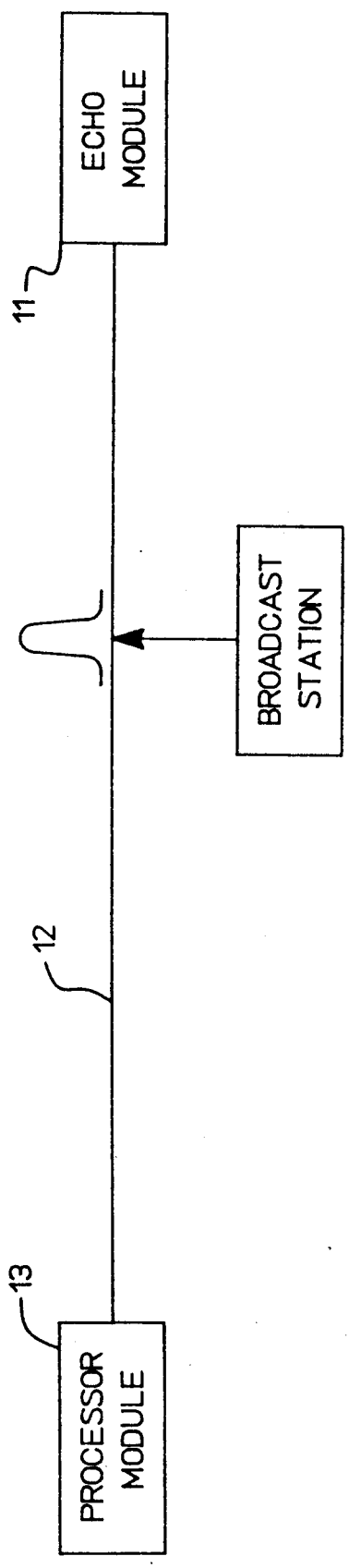
FIG_1A
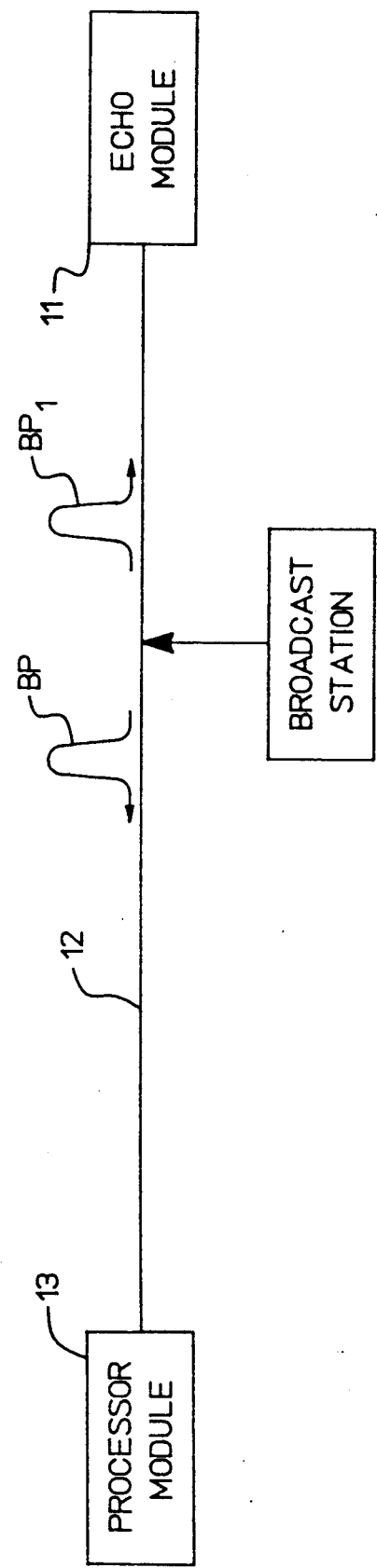
FIG_1B

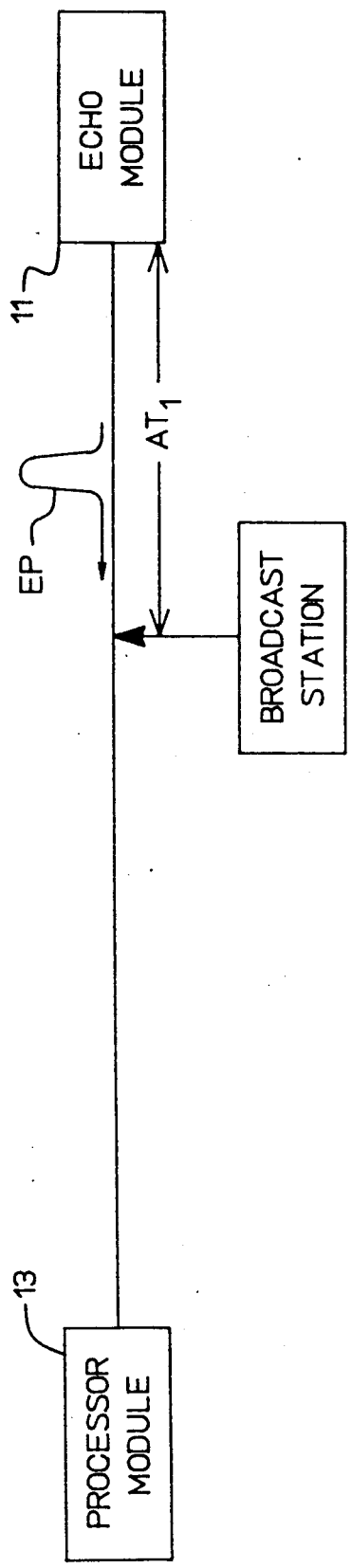
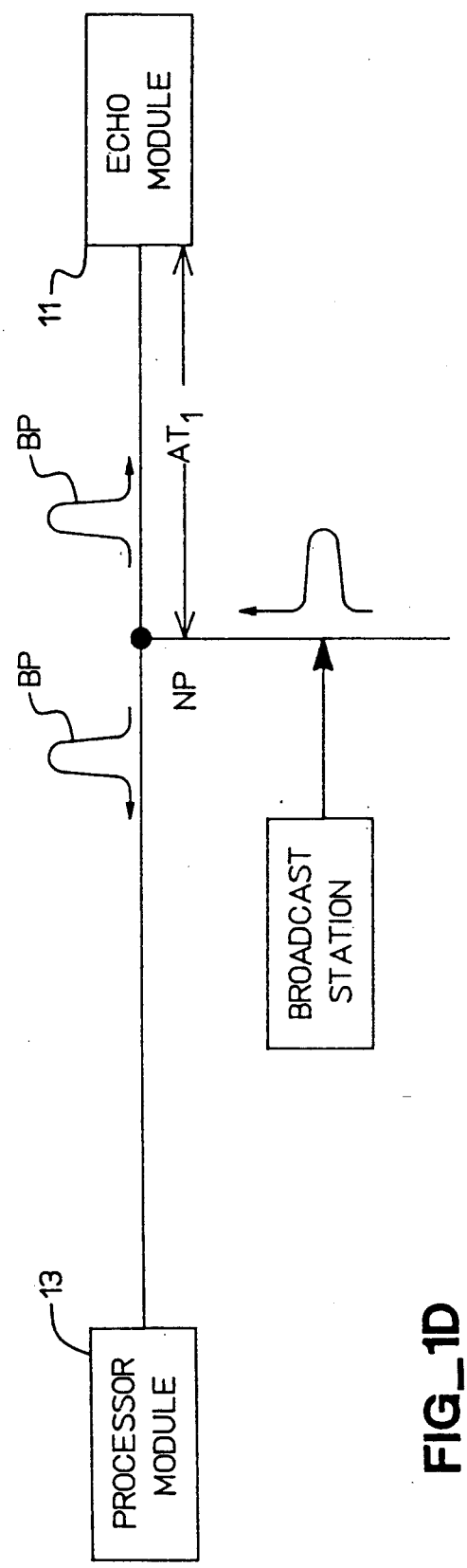
FIG_1C
FIG_1D

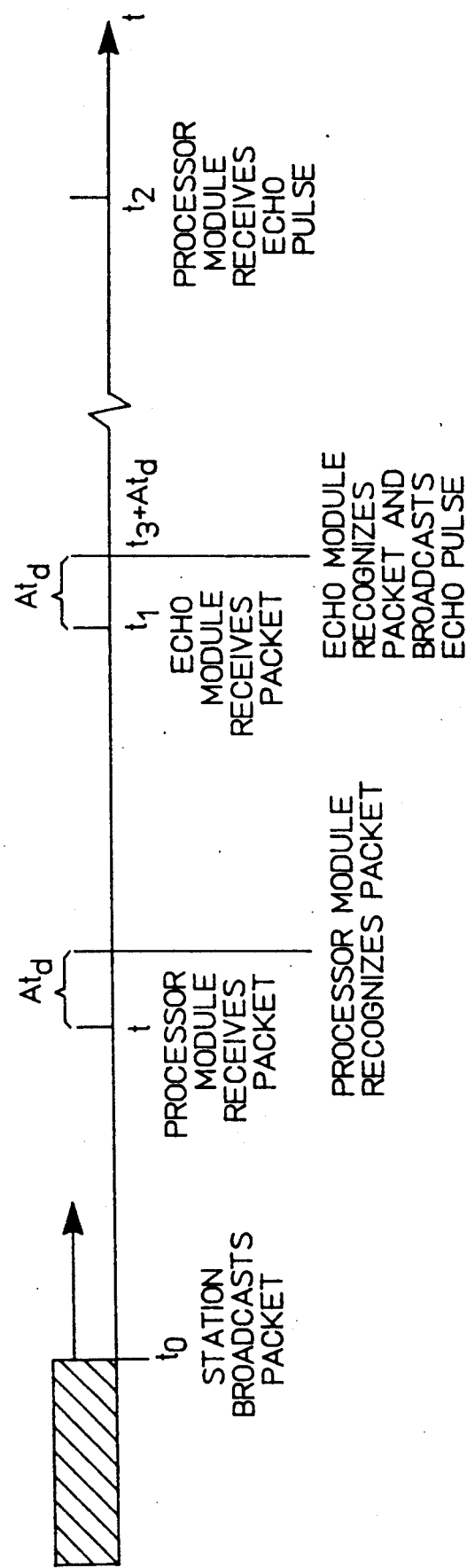
FIG_2
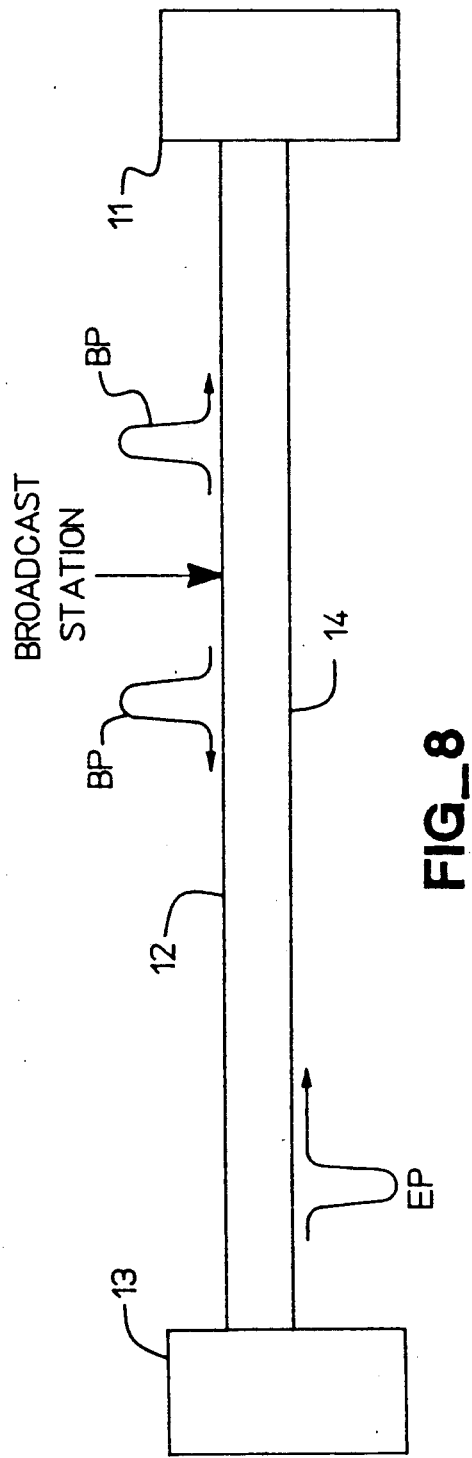
FIG_8

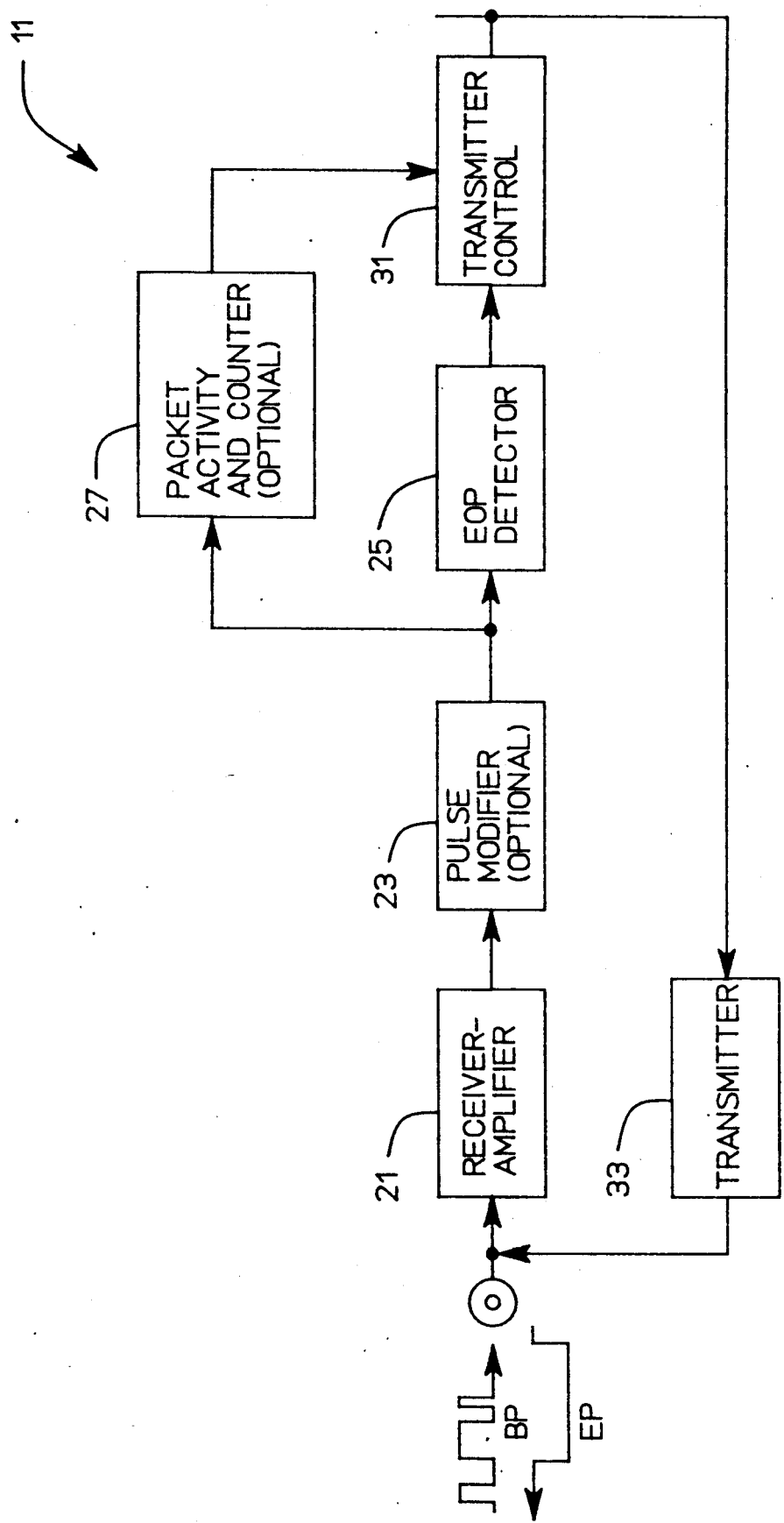
FIG_3

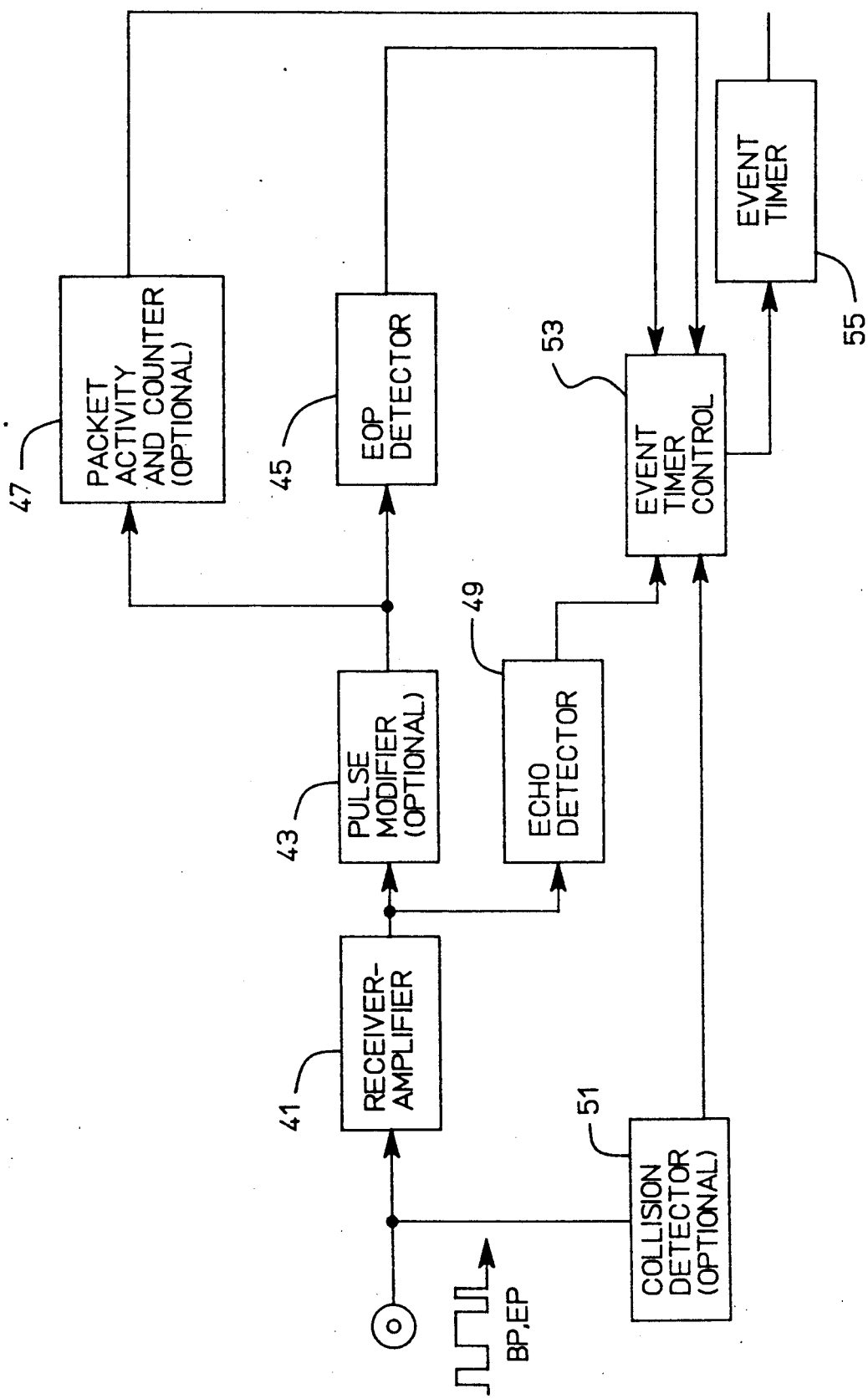
FIG_4

BROADCAST STATION LOCATOR FOR A LOCAL AREA NETWORK

TECHNICAL FIELD

This invention relates to local area networks and to apparatus for determining the location of each transmitting station in a local area network.

BACKGROUND ART

Although a local area network ("LAN") communications system such as Ethernet (trademark of the Xerox Corporation) allows a plurality of transceivers to tap into the cable upon which the network relies, with rather generous limits on the maximum number of transceivers and the distance of closest approach for such transceivers, it is necessary for some purposes to determine with acceptable accuracy the location of each broadcasting transceiver on the cable. Frye, in U.S. Pat. No. 3,434,049, and Oliver et al., in U.S. Pat. No. 4,766,386, disclose the use of time domain reflectometry techniques to determine whether a given cable has a substantial impedance discontinuity, indicating the presence of a cable short, an open cable or another similar problem with transmission of signals on the LAN cable. However, these techniques do not permit the determination of source identity and location, with acceptable accuracy, of a broadcasting station on the cable that is not associated with an impedance discontinuity.

It is an object of this invention to provide apparatus that can operate within the constraints imposed by an LAN system such as Ethernet and that allows determination of location of each broadcasting transceiver on a cable in the network.

SUMMARY OF THE INVENTION

This object is met by the invention which provides, in one embodiment, two devices, to be positioned at opposite ends of a linear cable network that contains a plurality of broadcasting transceivers. It is assumed that the LAN system has an interframe gap, similar to the 9.6–10.6 microseconds ("μsec") time interval or gap associated with an Ethernet or similar system, during which no transceiver broadcasts a signal after receipt of the immediately preceding signal.

Assume that a transceiver or other broadcasting station has just broadcast a signal in both directions on a cable 12, as illustrated in FIG. 1A; and assume that the location of this transceiver is not yet known. The broadcast signal will propagate in both directions on the cable 12, as illustrated in FIG. 1B. The propagating signal is received by an echo module 11, positioned at one end of the cable 12, and an echo pulse is broadcast by the echo module on the cable after a predetermined packet monitoring time interval of length $\Delta t_d$ that is much less than the length of the interframe gap $\Delta t_{gap}$. This rebroadcast occurs in the interframe gap or quiet period that would ordinarily follow the receipt of the propagating signal. Echo pulse broadcast may occur at other times as well.

The signal or packet originally broadcast by the transceiver is received by a processor module 13 at the other end of the cable 12, and the time $t_1$ at which the original signal arrives at the receiver-processor module is determined by this module. The echo pulse broadcast by the echo module 11 then arrives at the processor module 13 at a time $t_2$, and this time is determined by the processor module, with the same monitoring time delay $\Delta t_d$ included in $t_1$ and $t_2$. The length of the time interval $\Delta T_1$ required for a signal to travel from the broadcasting transceiver to the echo module is then determined by the relation $\Delta T_1 = (t_2 - t_1 - \Delta t_{dp})/2$, where $\Delta t_{dp}$ is a net time delay associated with signal processing in the processor module. where $\Delta t_{dp}$ is a time delay associated with echo pulse validation.

BRIEF DESCRIPTION OF THE DRAWINGS

FIGS. 1A, 1B and 1C illustrate broadcast of a packet by a station onto a cable, propagation of this packet in both directions on the cable, and broadcast of an echo packet at one end of the cable, according to the invention.

FIG. 1D illustrates broadcast of a packet onto a cable by a station positioned on a branch of the cable.

FIG. 2 is a graphic view of the time line for receipt and broadcast of the packets shown in FIGS. 1A, 1B and 1C.

FIG. 3 is a block diagram illustrating the overall operation of the functional blocks that comprise the echo module that is positioned at one end of an LAN cable.

FIG. 4 is a block diagram illustrating some of the operations of the functional blocks that comprise the receiver-processor module that is positioned at a second end of an LAN cable according to the invention.

FIG. 8 illustrates the use of two cables with the invention.

BEST MODE FOR CARRYING OUT THE INVENTION

Figure 5:
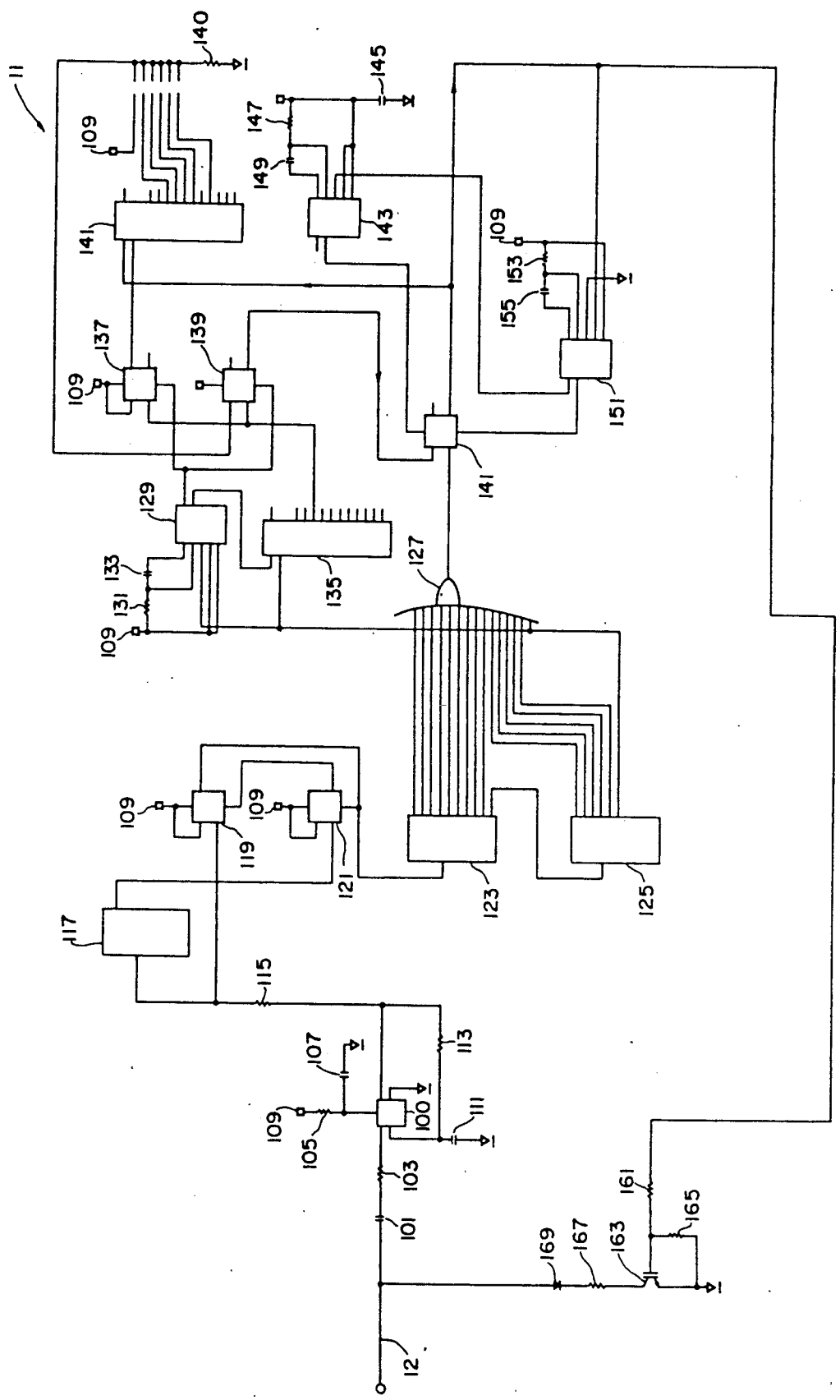
FIGS. 5, 6 and 7 are schematic circuit diagrams of the echo module, the processor module, and the event timer control and event timer modules that comprise one embodiment of the invention.

With reference to FIG. 1A, a signal that is introduced onto a LAN cable 12 by a broadcast station or transceiver that is tapped into the cable, will travel toward a first end of the cable and toward a second end of the cable as separate signals or packets BP, as illustrated in FIG. 1B. In one embodiment of the invention, an echo module 11 is positioned at one end of the cable 12, to receive the originally broadcast packet BP and to issue an echo pulse EP, as illustrated in FIG. 1C, after a predetermined monitoring time delay $\Delta t_d$ at the echo module 11. A processor module 13 positioned at a second end of the cable 12 receives the originally broadcast packet BP, notes the time $t_1$ of such receipt, receives the echo pulse EP and notes the time $t_2$ of such receipt, and determines the cable propagation time $\Delta T_1$ from the broadcast station to the echo module 13 approximately by the relation $\Delta T_1 = (t_2 - t_1 - \Delta t_{dp})/2$, where $\Delta t_{dp}$ is a net time delay for processing in the processor module 13.

According to the Open Systems Interconnection ("O.S.I.") Standard proposed by Zimmerman in I.E.E.E. Trans. on Commun., vol. COM-28, 1980, pp. 425–432, and adopted by the O.S.I. Standards Committee, a local area network may have as many as seven layers for message processing at each station. At the lowest level, called the physical layer, communication between station and cable occurs in units of individual bits and/or bytes. The physical layer may include cables, connectors, voltage level sensors and provision for particular signal generation and propagation standards. In the next higher level, called the data link layer, signals are exchanged by use of frames. A frame is a sequence of bytes, including a header that specifies source and destination of the frame and certain control and error check fields, plus the data to be transported. The next higher level, called the network layer, transports information across the LAN in packets and is the "lowest" level that recognizes and works with the topology of the LAN. A packet may be a collection of frames, spaced apart by no more than a predetermined amount on the LAN cable that carries the signals.

A local area network communication system such as Ethernet allows use of a branching, non-rooted tree network or bus topology and limits the maximum station separation to about 0.5 kilometers at the physical layer. In order to minimize or at least control packet collisions on the LAN, one of the constraints built into the system is that, after a transceiver has either received or transmitted a message or has sensed a collision of two packets, the transceiver must remain silent and not broadcast for at least a minimum time interval of length $\Delta t_{gap}$, gap called the interframe gap length. For a system such as Ethernet, $\Delta t_{gap} = 9.6$–$10.6$ $\mu$sec, depending on the circumstances. Imposition of silence on the network for an interframe gap allows a signal that is received by a transceiver on the LAN to propagate to its destination before another such signal is launched by a transceiver that earlier received this signal. Collisions of packets propagating on the LAN are not avoided but are merely reduced in number by use of the interframe gap.

The interframe gap time interval is used to advantage by the invention to determine the position on the network, with reasonable accuracy, of the station that last broadcast a packet on the network. The interframe gap time interval is used to propagate an echo pulse EP for the broadcast packet BP received on the cable 12, from the echo module 11 to the processor module 13; and formation of a simple difference in times of arrival of the two signals at the module 13 is used to determine the distance, expressed in signal propagation time, of the station that broadcast the "last" packet on the cable 12 from the echo module 11. If the broadcasting station is positioned on a branch of the LAN network that intersects the "main" cable 12, on which the echo and processor modules 11 and 13 are located, at node point NP as shown in FIG. 1D, only the temporal distance $\Delta T_1$ from this node point NP to the echo module is determined by this technique. FIG. 2 graphically illustrates the time line for receipt of the broadcast packet BP of the modules 11 and 13 and broadcast of an echo pulse EP by the echo module 11.

FIG. 3 is a block diagram illustrating the major functional components of the echo module 11. A broadcast packet BP is received at an input terminal of the echo module 11 as shown. The input terminal includes a receiver-amplifier module 21 that receives a broadcast packet BP as a sequence of pulses and issues as an output signal a sequence of approximately square pulses having the same lengths, relative separations and relative positions as the pulses that comprise the broadcast packet received as an input signal; each pulse that is part of the packet received is reformed as an approximately square pulse, and broadcast packets with up to 20 dB of attenuation are recognized and reformed by the receiver-amplifier module 21. The receiver-amplifier module 21 should be capable of accurately reproducing signals with an associated frequency of up to 10 MHz or the maximum operating frequency permitted at the physical layer on the cable network, and the module 21 should filter out or otherwise attenuate higher frequency cable noise. This filtering may be done by a standard arrangement of resistor and capacitor in series with a capacitor bypass to ground, where this resistor-capacitor circuit has an associated break frequency somewhere above the maximum operating frequency.

The output signal from the receiver-amplifier module 21 is fed to a pulse modifier module 23 (optional) that receives the sequence of squared pulses that comprise the reformed broadcast packet. The pulse modifier module 23 issues a single pulse or sequence of pulses having a first predetermined voltage $v_1$ and having a time interval of length $\Delta t_{p1} = 50$ nanoseconds ("nsec"), each as an output signal, if at least one square pulse is received at the input terminal, and issues a d.c. output signal of duration $\Delta t_{p2}$ of a second predetermined voltage $v_2$ if no square pulse is received at the input terminal of the module 23. One such pulse of temporal length $\Delta t_{p1}$ is issued in response to receipt of each pulse that is part of the packet, even though the time interval corresponding to the length of the broadcast packet BP may be less than 50 nsec. A pulse of temporal length 50 nsec is the minimum length pulse that can travel through a series of delay lines without unacceptable loss of definition. If Manchester encoding of signals is used for the LAN, each bit of such a signal comprises two consecutive components, a logical "zero" and a logical "one", each approximately 50 nsec in length. Inclusion of the pulse modifier module 23 provides a pulse of better definition.

The pulse modifier module 23 produces an output signal that is fed to an end-of-packet ("EOP") detector 25 as an input signal. If such input signal includes a pulse of temporal length 50 nsec and of voltage $v_1$, the EOP detector 25 issues as an output signal a pulse of a third predetermined voltage $v_3$ of temporal length equal to a time interval $\Delta t_{p1} + \Delta t_{p2} = 450$ nsec; if the detector 25 does not receive another input signal pulse with voltage $v_1$ within a time interval of length $\Delta t_{p2}$ after the detector 25 receives the immediately preceding input signal, the output signal of the EOP detector 25 makes a transition to a fourth predetermined voltage $v_4$. The output signal of the EOP detector 25 will thus make a transition from the voltage $v_3$ to the voltage $v_4$ only if a second pulse is not received by the detector 25 within a time interval of length $\Delta t_{p2} = 400$ nsec after receipt of the preceding pulse; any time interval of length $> 200$ nsec would probably suffice here. For a communications system such as Ethernet, worst case Manchester encoding of signals produces a gap or time interval of length at most 200 nsec between successive positive edges of the data. The circuit used for the EOP detector 25 uses 400 nsec time separation as a criterion for absence of a next pulse, because the phase shift of the receiver-amplifier module 21 can be as much as 50% on signals of varying amplitude. For example, a shift in the d.c. level of the receiver-amplifier module 21 may cause that module to "hiccup" for a short period of time as it adjusts to the new d.c. bias level. The threshold length $\Delta t_{p2}$ associated with the end-of-packet detector 25 may be varied to take account of other network constraints on processing of data. If the pulse in the broadcast packet BP thus received by the echo module 11 is the "last" such pulse before an interframe gap, the EOP detector 25 will sense this and its output signal will be a pulse of length $\Delta t_{p1} + \Delta t_{p2} = 450$ nsec and of voltage $v_3$, followed by a transition to an unvarying voltage level $v_4$. If the pulse sensed in the broadcast packet BP is not the last pulse received before an interframe gap, the output signal of the EOP detector 25 will not make a transition to the voltage level $v_4$ after a time interval of length 450 nsec.

The output signal of the receiver-amplifier module 21 is also received by a packet activity module 27 (optional) that counts the number of bits N received in the broadcast packet input signal at the echo module 11 and counts the number of packets M received. If the number N is at least equal to a predetermined positive number $N_1$, the packet activity module 27 issues a start-of-packet ("SOP") output signal of a fifth predetermined voltage $v_5$ and resets N to zero; and if $N<N_1$, the module issues a SOP-absent output signal of a sixth predetermined voltage $v_6$, indicating that the signal received at the module 11 is not a packet, and resets N to zero. In practice, the number $N_1$ may be chosen to be 64 or 128 or some similar number that distinguishes between the number of bits contained in a genuine packet and the number of bits received in a packet fragment that might result from collision of two such packets. An SOP output signal of voltage $v_5$ indicates that the echo module 11 is receiving the start of a bona fide packet.

A packet counter within the packet activity module 27 receives and counts the SOP signals. If the number M of such SOP signals received is at least equal to a second predetermined number $M_2$, and if $N \leq N_1$, the packet activity module 27 issues a transmitter control enable signal having a seventh predetermined voltage $v_7$; and if $N<N_1$ or $M<M_2$, or both, the module 27 issues an output signal having an eighth predetermined voltage $v_8$.

The packet counter is not required by the invention, but its inclusion allows the operator to avoid time delays associated with propagation of the echo packet BP and problems with signal repeaters, through control of the number $M_2$. If $M_2$ is chosen to be 60, for example, an echo packet will be issued by the echo module 11 at most once for every 60 broadcast packets BP received from the plurality of broadcasting stations on the LAN. The SOP counter 27 can be effectively removed from the packet activity module 27 by setting $M_2 \leq 1$. The packet activity and counter module 27 may be effectively deleted, for example by setting $N_1=1$ or by deleting the circuitry that performs the functions of the module 27.

A transmitter control module 31 receives the output signal from the EOP detector 25 and the SOP output signal or the output signal from the packet activity and counter module 27; and if the voltages associated with these two output signals have the levels $v_4$ and $v_5$ (or $V_4$ and $V_7$), respectively, the transmitter control module 31 issues a transmitter control output signal of a ninth predetermined voltage $v_9$ to enable a transmitter to issue an echo pulse EP. If the output signals of one or more of the EOP detector 25 or the packet activity and counter module 27 are not equal to $v_4$ or $v_5$, respectively, the transmitter control module 31 issues a transmitter control output signal having a tenth predetermined voltage $v_{10}$ that disables or does not activate the transmitter. If the module 31 issues a transmitter enable signal, this module also issues a reset signal that is fed back to the packet activity module 27 to reset the SOP counter number M to $M=0$.

The output signal from the transmitter control module 31 is received by a transmitter module 33; and if this output signal has the voltage level $v_9$, the transmitter module 33 is enabled and broadcasts an echo pulse EP on the cable that is a single, constant-amplitude pulse having a length equal to a predetermined time length $\Delta t_{p3}$, which may be chosen to be of the order of 1 $\mu$sec. From the time the front end of the broadcast packet BP is received at the echo module 11 until the front end of the echo pulse EP is issued by the transmitter module 33 onto the cable, a monitoring delay time interval of length $\Delta t_d$ approximately equal to 455 nsec elapses; this temporal length is known to an accuracy of within two nsec. The echo pulse EP will travel down the cable 12 toward the processor module 13 during the interframe gap or at any time in another embodiment. When the echo pulse EP is received by the processor module 13 at the other end of the cable 12, it is expected that no other packet or pulse will be present.

At the other end of the cable 12, the processor module 13 also receives the original broadcast packet BP from one of the broadcast stations that is tapped into the cable 12. The input signal representing the broadcast packet BP is passed through a receiver-amplifier module 41 that functions identically to the receiver-amplifier module 21 for the echo module 11. The output signal from the receiver-amplifier module 41 is then passed to a pulse modifier module 43 (optional) that functions identically to the pulse modifier module 23 for the echo module 11. The pulse modifier module 43 for the processor module 13 thus issues an output signal that is a pulse having a predetermined length $\Delta t_{p4} = 50$ nsec and having a predetermined voltage $v_{11}$, if at least one pulse is received by the module 43; and the module 43 issues a d.c. output signal having a predetermined voltage $v_{12}$ if no pulse is received at the module 43. An end-of-packet detector 45, constructed similarly to the EOP detector 25 for the echo module 11, receives the output signal from the pulse modifier module 43; and if the pulse received by the processor module 13 is the last pulse before an interframe gap, the EOP detector 45 will produce a single pulse of predetermined voltage $v_{13}$ having length $\Delta t_{p4} + \Delta t_{p5}, =450$ nsec followed by transition to a d.c. signal having a predetermined voltage $v_{14}$.

A packet activity module 47 (optional), constructed similarly to the packet activity module 27 but without the SOP counter, receives the output signal from the receiver-amplifier module 41 and counts the number of bits N received in the input signal. If the number N of bits received by the pocket activity module 47 is at least equal to a predetermined positive number $N_3$, the packet activity module 47 issues a start-of-packet SOP output signal having a predetermined voltage $v_{15}$; and if $N<N_3$, the module 47 issues a SOP-absent output signal having a predetermined voltage $v_{16}$.

An echo detector 49 receives the output signal from the receiver-amplifier module 41 and determines the single-pulse length of this output signal. If the pulse length exceeds a predetermined temporal length $\Delta t_{p6}$ the echo detector 49 issues an echo-detected output signal having a predetermined voltage $v_{17}$; and if this pulse length does not exceed the length $\Delta t_{p6}$, the echo detector 49 issues an echo-absent output signal having a predetermined voltage $v_{18}$. The temporal length $\Delta t_{p6}$ may be chosen to be about 800 nsec if the temporal length $\Delta t_{p3} = 1$ $\mu$sec; in any event, $\Delta t_{p6}$ is chosen to be less than but approximately equal to $\Delta t_{p3}$.

Collisions of signals are part of the environment in which a transceiver or other station operates on an LAN of this type, and the processor module 13 is provided with an optional collision detector 15 of conventional design that receives each incoming broadcast packet. If a portion of one such packet is overlapped by a portion of another such incoming packet, the collision detector 51 issues on output signal having a predetermined voltage $v_{19}$, indicating that a packet collision is detected; if no packet collision is sensed by the module 51, the collision detector 51 issues an output signal having a predetermined voltage $v_{20}$.

An event timer control module 53 receives as input signals the output signals of the EOP detector 45, the packet activity module 47, the echo detector 49 and the collision detector 51 and produces a first output signal of predetermined voltage $v_{21}$ if: (a) the EOP detector output signal for BP has a voltage equal to $v_{13}$; (b) the packet activity and counter module output signal for BP has a voltage equal to $v_{15}$; (c) the echo detector module output signal has a voltage equal to $v_{18}$; and (d) (optional) the collision detector module output signal has a voltage equal to $v_{20}$; this indicates that a broadcast pulse has previously arrived at the processor module 13 and that this packet to arrive is EP, a bona fide echo pulse.

An event timer module 55 receives the event timer control output signal and resets to zero and activates an event timer at the time $t_1$ of receipt of an output signal of voltage $V_{21}$. The running of the timer in the timer module 55 is stopped at a time $t_2$ at which the event timer module 55 receives an event timer control module output signal of voltage $V_{22}$, or when the accumulated time exceeds a predetermined maximum time $\Delta t_{max}$. The accumulated time $\Delta t$ on the timer between the point at which the timer is reset and started, representing receipt of BP, and the time at which the timer is stopped, representing receipt of EP, is the difference $\Delta t = t_2 - t_1$ of times of arrival of the front ends of the broadcast packets BP and EP at the processor module 13 with the time delay $\Delta t_d$ incorporated in each of the times $t_1$ and $t_2$ by processing in the processor module 13. The distance, measured in signal propagation time on the cable 12, from the station that broadcasts the packet BP and the echo module 11 is then determined by the relation $\Delta T_1 = (\Delta t - \Delta t_{dp})/2$.

FIG. 5 illustrates the major functional groupings of electronic components and devices that comprise the echo module 11, according to one embodiment of the invention. The receiver-amplifier module 21 comprises a high quality amplifier unit 100 that receives the input signal from the cable 12 through a capacitor 101 and a resistor 103, arranged in series at an input terminal of the amplifier 100. The amplifier 100 is preferably chosen to amplify pulses having attenuation as much as 20 dB and to square each pulse so that the output signal from the amplifier 100 is a sequence of squared and amplified pulses that otherwise replicate the sequence of pulses received at the input terminal of the amplifier 100. An amplifier power supply 109 has a standard voltage $V_{cc}$ such as 5 volts and is connected to the power supply input terminal of the amplifier 100 through a resistor 105 that may have a resistance value of the order of 20 Ohms. The power input terminal is also grounded through a capacitor 107 that may have a value of the order of 100 nanofarads ("nf"). Any common emitter and common base terminals of the amplifier 100 are connected to ground through a capacitor 111 that may have a value of the order of 1 nf and are also connected to the output terminal of the amplifier 100 through a resistor 113 having a resistance value of the order of 3 kilo-ohms.

The pulse modifier module 23 (optional) receives the output signal of the receiver-amplifier module 21 through a resistor 115 having a resistance value of the order of 50 Ohms, and this signal is passed to the input terminal of a time delay module 117 that produces an output signal that is a replica of the input signal but delayed by a time $\Delta t_{p1} = 50$ nsec.

The input signal to the time delay module 117 is also fed to the input terminal of a first flipflop 119. Each flipflop used herein is assumed to have a data input terminal D, a clock input terminal CLK, a preset input terminal PR, a clear input terminal CLR, and two output terminals for logically complementary output signals Q and Q*. The flipflop 119 has its D input terminal held high by connection directly to the power supply 109, and its clock input terminal CLK receives the input signal delivered to the time delay module 117. A second flipflop 121 also has its D input held high by direct connection to the power supply 109, and its clock input terminal CLK receives the output signal, with the associated time delay of $\Delta t_{p1} = 50$ nsec, from the time delay module 117. The Q* output terminal of the flipflop 121 is connected to the clear input terminal CLR of the flipflop 119; and the Q output terminal of the flipflop 119 is connected to the clear input terminal CLR of the flipflop 121 and also serves as the source of the output signal of the pulse modifier module 23. The two clock input terminals CLK of the flipflops 121 and 119 each receive a pulse, with the two pulses being displaced by a time interval of length $\Delta t_{p1} = 50$ nsec from one another; and the Q* output signal from the flipflop 121 is used to clear the flipflop 119. The result is a pulse of temporal length $\Delta t_{p1} = 50$ nsec at the Q output terminal of the flipflop 119, if the input signal to the pulse modifier module 23 has a temporal length of any amount that can be sensed by the flipflops and 121.

The EOP detector module 25 includes one or more multi-tap time delay modules that produce a plurality of output signals that are time delayed relative to one another by approximately 25 nsec or an integral multiple thereof. A sequence of such time delayed output signals is produced with a maximum time delay of $\Delta t_{p2} = 400$ nsec as indicated; again, any $\Delta t_{d2} > 200$ nsec would probably suffice here. In the embodiment shown in FIG. 5, two time delay modules 123 and 125, each providing up to 250 μsec time delay, are used together to produce the desired set of 17 time delayed signals with associated time delays 0, 25, 50, ..., 400 nsec. The output signals from the time delay module or modules are fed to a logical summing means 127, whose output signal is thus a single pulse of temporal length $\Delta t_{p1} + \Delta t_{p2} = 450$ nsec. At the end of this pulse, the output signal changes to a different voltage unless another input signal to the EOP detector module 25 has been received within a time interval of length $\Delta t_{p2} = 400$ nsec after receipt of the immediately preceding pulse.

Under a worst case Manchester encoding circumstance on Ethernet at 10 MHz, successive positive edges of the incoming data would be separated by at most 200 nsec; and a pulse stand-off time of $\Delta t_{p2} = 400$ nsec is used here to compensate for possible degradation of signals. If no incoming pulse follows another incoming pulse within 200 nsec in time, it is assumed that the present pulse is the last pulse of a packet received by the echo module 11; and the result of this is that the output signal from the EOP detector module 25 is a pulse of length $\Delta t_{p1} + \Delta t_{p2} = 450$ nsec, followed by a transition to a different voltage level.

The packet activity and counter module 27 (optional) includes a monostable vibrator 129, with a first input terminal receiving the output signal from the end-of-packet detector 25. The vibrator 129 has a second input terminal and a clear input terminal CLR that are directly tied to the power supply 109. A fourth input terminal REX/CEX of the vibrator 129 is connected to the power supply 109 through a resistor 131 having resistance of the order of 5 kilo-ohms; and a fifth input terminal CEX of the multi-vibrator 129 is connected to the power supply 109 through a series combination of the resistor 131 and a capacitor 133 that has a capacitance value of the order of 0.4 nf. The vibrator 129 will clear itself after a time interval of approximately 0.8 $\mu$sec.

As used herein, a monostable vibrator is an analog device having first, second and clear input terminals, fourth and fifth control input terminals denoted REX/CEX and CEX, two output terminals denoted Q and Q* that produce logically complementary output signals, and a power supply terminal denoted Vcc. An example of such a vibrator is the 74LS123 retriggerable monostable vibrator sold by Motorola. In one mode of use, the input terminals second, clear, fourth and fifth are connected directly or indirectly to the power supply so that an internal RC circuit provides the length of the retriggering time interval. However, a resistor of resistance value RE may be connected between the REX/CEX terminal and the power supply, and a capacitor of capacitance value CE together with this resistor may be connected in series between the CEX terminal and the power supply; and the time constant $\tau$ associated with the retriggering time interval then becomes an adjustable parameter, viz.

$\tau = K(RE)(CE)$, where K is a numerical constant, equal to approximately 0.45 for the Motorola 74LS123 vibrator.

The multi-vibrator 129 has two output terminals, and the Q* output terminal is connected to the CLR input terminal of a first ripple counter 135 that produces a single output pulse when the count N of the counter reaches a predetermined positive integer $N_1$. The clock input terminal CLK of the counter 135 receives the output signal from the EOP detector module 25, or from the amplifier-receiver module 21. The output signal of the counter 135 is fed to the clock input terminals CLK of each of two flipflops 137 and 139, and the Q output terminal of the vibrator 129 is connected to the clear input terminals CLR of each of these two flipflops. The D input terminal of the first flipflop 137 is connected directly to the power supply 109, and the D input terminal of the second flipflop 139 receives a signal from another source not yet discussed. The Q output terminal of the first flipflop 137 is connected to the clock input terminal CLK of a second ripple counter 141, which is assumed to produce a pulse at the output terminal thereof when the count M of this second counter reaches a second predetermined positive integer $N_2$. The output terminal of the second counter 141 is connected to the D input terminal of the second flipflop 139. The output signal issued by the Q* output terminal of the second flipflop 139 serves as the output signal from the packet activity module 27.

Figure 6:
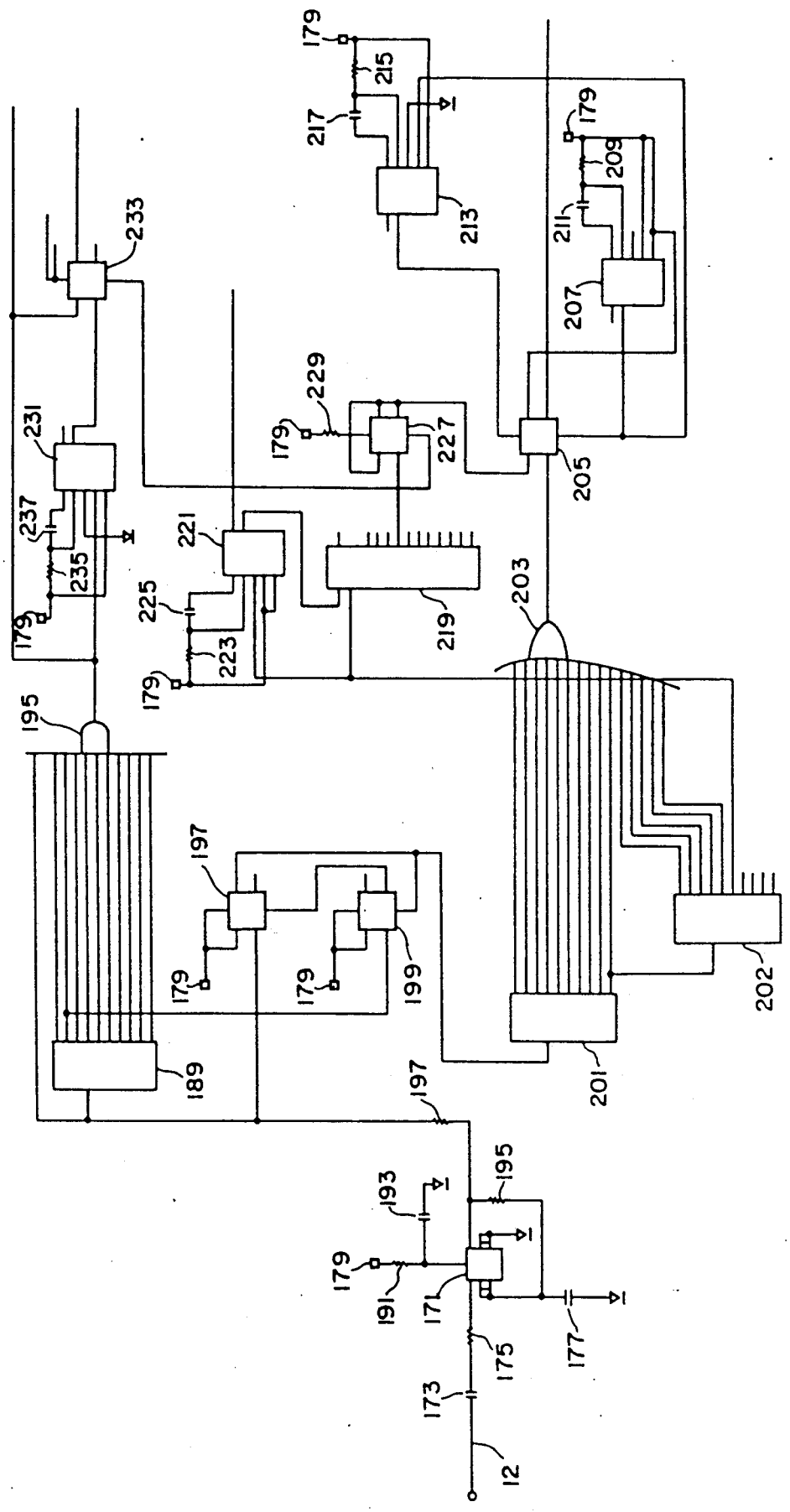

In an embodiment of the invention in which the number M of packets received is not counted, the first flipflop 137 and the second counter 141 would be deleted and the D input terminal of the second flipflop 139 would be connected to the power supply 109, either directly or through a resistor (optional) as shown for the flipflop 227 that is a part of the packet activity and counter and module 47 for the processor module 13 in FIG. 6.

The transmitter control module 31 comprises a flipflop 141 and two monostable vibrators 143 and 151, connected as follows. The D input terminal and the clock input terminal of the flipflop 141 receive the output signals from the packet activity and counter module 127 and the end-of-packet detector 25, respectively, and the Q* output terminal of this flipflop issues the EOP detector output signal.

The second input and clear input terminals of a first monostable vibrator 143 are connected to ground through a capacitor 145 that has a capacitance value of the order of 10 $\mu$f and are connected to the supply 109 through a resistor 146 (optional) that has a resistance value of the order of 5 kilo-ohms. A fourth input terminal of the vibrator 143 is connected to the power supply 109 through a resistor 147 that has a resistance value of the order of 70 kilo-ohms; and a fifth input terminal is connected to the power supply 109 though a series combination of the resistor 147 and a capacitor 149 having a capacitance value of the order of 1 nf. The Q* output terminal of the vibrator 143 is connected to the preset input terminal PR of the flipflop 141. The vibrator 43 will clear itself after a time interval $\Delta t_v$ of about 30 $\mu$sec so that this part of the circuit is available to analyze another packet; in practice, any choice $\Delta t_v > 10$ $\mu$sec would probably suffice here.

A first input terminal of the second monostable vibrator 151 is connected to ground, and the second input and clear input terminals thereof are connected to the power supply 109. A fourth input terminal of the vibrator 151 is connected to the power supply through a resistor 153 having a resistance value of the order of 20 kilo-ohms; and a fifth input terminal is connected to the power supply 109 through a series combination of the resistor 153 and a capacitor 155 having a capacitance value of the order of 0.1 nf. The vibrator 151 will clear itself after a time interval of about 0.9 $\mu$sec. The Q output terminal of the vibrator 151 is connected to the first input terminal of the vibrator 143, and the Q* output terminal of the vibrator 151 is connected to the clear input terminal CLR of the flipflop 141. The Q output signal from the flipflop 141 is also connected to the clear input terminal CLR of the second counter 141 of the packet activity module 27 so that this Q* output signal serves as a reset signal for the packet activity module 27 and as the output signal for the transmitter control module 31 that enables the transmitter module 33.

The transmitter module 33 receives the output signal from the transmitter control module 31, and this signal is passed through a first resistor 161 (optional) having a resistance value of the order of 500 Ohms to the base of an npn transistor 163 whose emitter is grounded. The base of the emitter 163 is connected to ground through a second resistor 165 (optional) that has a resistance value of the order of 500 Ohms. The collector of the transistor 163 is connected to the end of the cable 12 through a series combination of a resistor 167 having a resistance value of the order of 30 Ohms and a diode 167 (optional) whose anode is connected to the end of the cable 12. The transmitter module 33 can be implemented in many other ways as well. This completes the discussion of the embodiment of the echo module 11 shown in FIG. 5.

FIG. 6 illustrates the major functional groupings of electronic components and devices that comprise the receiver-processor module, except the collision detector 51, which is conventional and well known in the art, the event timer control module 53, and the event timer module 55.

The amplifier-receiver module 41 in the receiver-processor module 13 includes an amplifier 171 that amplifies signals that are attenuated up to 20 dB and squares any pulse received so that the output signal from the amplifier 171 is a sequence of squared pulses with temporal lengths and separations between consecutive pulses that are substantially those of the sequence of input pulses received in the module 41. The amplifier 71 receives the input signal from the end of the cable 12 through a capacitor 173 having a value of the order of 0.1 $\mu$f and a resistor 175 (optional) having a resistance value of the order of 100 Ohms. A common emitter terminal and a common base terminal, if any, of the amplifier are connected to ground through a capacitor 177 that may have a value of the order of 1 nf. A high voltage power supply 179 is connected to the power supply terminal of the amplifier 171 through a resistor 181 (optional) having a resistance value of the order of 20 Ohms, and the power supply input terminal is also connected to ground through a capacitor 183 having a capacitance value of the order of 1 nf. The output terminal of the amplifier 171 issues the receiver-amplifier module output signal, and this output terminal is also connected to ground through the capacitor 177.

The receiver-amplifier module output signal is passed through a resistor 197 (optional) having a resistance value of the order of 50 Ohms to an input terminal of a multi-tap time delay module 189 that provides a 50 nsec time delay and is part of the pulse modifier module 43 (optional). The output signal from the module 41 is also passed to the clock input terminal CLK of a first flipflop 197, and the output signal of the time delay module 189 with associated time delay 50 nsec is passed to the clock input terminal CLK of a second flipflop 199. The D input terminals of the two flipflops 197 and 199 are both directly connected to the power supply 179 so that receipt of a clock pulse automatically causes issue of a pulse. The Q output terminal of the flipflop 199 is connected to the clear input terminal CLR of the flipflop 197, and the Q output terminal of the flipflop 197 is connected to the clear input terminal CLR of the flipflop 199 and also serves as a source of the output signal from the pulse modifier module 43. The output signal from the module 43 is again a pulse of temporal length $\Delta t_{p4} = 50$ nsec.

This first output signal of the pulse modifier module 43 is received by the end-of-packet detector 45 at the input terminal of a multi-tap time delay module that is part of the EOP detector 45. As shown in the embodiment of FIG. 6, the time delay module for the EOP detector 45 may comprise two time delay modules 201 and 202 in a combination that provides time delayed output signals with associated time delays of 25 nsec increments from 0 nsec, up to 400 nsec. The time delayed output signals are collectively fed to a logical summing means 203 whose output terminal is connected to the clock input terminal of a flipflop 205.

The D input terminal, the preset input terminal PR and the clear input terminal CLR of the flipflop 205 receive signals from sources not yet discussed, and the Q* output terminal provides the EOP detector output signal for the module 45. The Q output terminal of the flipflop 205 is connected to a first input terminal of a first monostable vibrator 207, which has second input and clear input terminals connected to the power supply 179. A fourth input terminal of the vibrator 207 is connected to the power supply 179 through a resistor 209 having resistance value of the order of 5 kilo-ohms; and a fifth input terminal 211 is connected to the power supply 179 through a series combination of the resistor 209 and a capacitor 211 having capacitance value of the order of 0.1 nf. The vibrator 207 will clear itself after a time interval of about 0.2 $\mu$sec. The Q* output terminal of the first monostable vibrator 207 is connected to the clear input terminal CLR of the flipflop 205 and to a second input terminal of a second monostable vibrator 213 whose first input terminal is grounded. The clear input terminal of the vibrator 213 is connected to the power supply 179; a fourth input terminal is connected to the power supply 179 through a resistor 215 having a resistor value of about 100 Ohms; and a fifth input terminal is connected to the power supply 179 through a series combination of the resistor 215 and a capacitor 217 having a capacitance value of the order of 1 nf. The vibrator 213 will clear itself after a time interval of about 0.1 $\mu$sec. The Q* output terminal of the vibrator 213 is connected to the preset input terminal PR of the flipflop 205. The vibrator 213 will clear itself after a time interval of about 54 $\mu$sec, in order to re-enable this part of the circuit to analyze another incoming pulse.

The packet activity and counter module 47 (optional) includes a ripple counter 219 and a monostable vibrator 221 that receive the output signal from the pulse modifier module 43, or from the receiver-amplifier module 41, at the clock input terminal and first input terminal, respectively, of the counter 219 and vibrator 221. The second input and clear input terminals of the vibrator 221 are connected directly to the power supply 179. A fourth input terminal of the vibrator 221 is connected to the power supply 179 through a resistor 223 having a resistance value of the order of 5 kilo-ohms; and a fifth input terminal of the vibrator 221 is connected to the power supply 179 through a series combination of the resistor 223 and a capacitor 215 having a capacitance value of the order of 1 nf. The vibrator 221 will clear itself after a time interval of about 2.25 $\mu$sec. The Q* output terminal of the vibrator 221 is connected to the clear input terminal CLR of the counter 219; and the Q output terminal provides the output signal of the packet activity module 227. The ripple counter 219 issues a pulse at its output terminal when the count N of pulses received directly or indirectly from the receiver-amplifier module 41 exceeds a third predetermined number $N_3$, which may be of the order of 60–130.

The output terminal of the counter 219 is connected to the clock input terminal CLK of a flipflop 227 whose D input terminal and preset input terminal PR are connected to the power supply 179 through a resistor 229 (optional) having a resistance value of the order of 5 kilo-ohms. The clear input terminal CLR of the flipflop 227 is connected to the Q output terminal of the monostable vibrator 221. The Q* output terminal of the flipflop 227 is connected to the D input terminal of the flipflop 205. The Q output terminal of the vibrator 221 issues the output signal of the packet activity detector 47.

The echo detector module 49 includes a multi-tap time delay module 189, an AND gate 195, a monostable vibrator 231 and a flipflop 233; the echo detector output signals control the reaction of the remainder of the processor module 13. The output signals from the time delay module 189 are passed through the AND gate 195; and the output signal thereof, with associated time delay $\Delta t_{dp} \approx 250$ nsec, is passed to the second input terminal of a monostable vibrator 231 whose first input terminal is grounded. A clear input terminal of the vibrator 231 is connected to the power supply 179; a fourth input terminal is connected to the power supply 179 through a resistor 235 having a resistance value of about 5 kilo-ohms; and a fifth input terminal is connected to the power supply 179 through a series combination of the resistor 235 and a capacitor 237 having a capacitance value of about 0.4 nf. The vibrator 231 will clear itself after a time interval of about 800 nsec. The Q* output terminal of the vibrator 231 is connected to the clock input terminal CLK of a flipflop 233 whose clear input terminal CLR receives the output signal from the packet activity module 47. The output signal from the AND gate 195 provides a first output signal from the echo detector module 49, indicating that the candidate pulse received from the cable 12 by way of the module 41 is at least 250 nsec in length. This output signal is also fed to the D input terminal of the flipflop 233, and the Q output terminal thereof issues a second output signal from the module 49, indicating that the candidate pulse is at least 800 nsec in length and that a "true" echo packet has arrived.

Figure 7:
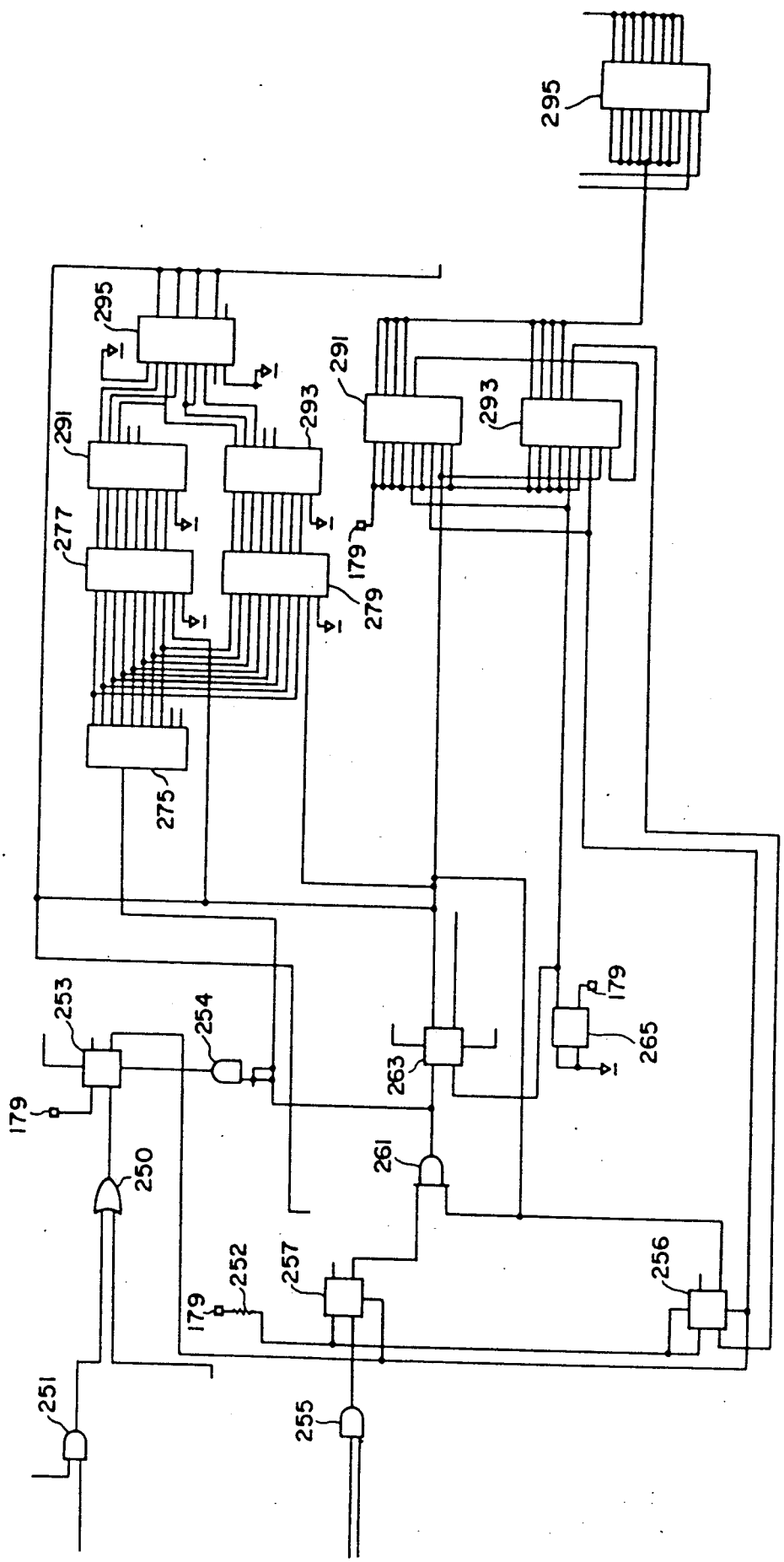

The details of the event timer control module 53 and the event timer module 55, together with certain features that are not a part of the invention, are illustrated in FIG. 7. The output signal from the EOP detector 45 and a processor module enable signal SUREN are received at two input terminals of an AND gate 251, and the output signal thereof is passed to the input terminal of a two-input OR gate 252 (optional) that receives at its second input terminal a signal indicating that the data being received and analyzed for some other process are valid. The data valid signal could, for example, be generated by analysis of data received and analyzed by a time domain reflectometer ("TDR") that may operated in parallel with the invention for purposes of determining the existence of one or more impedance discontinuities on the cable 12; the use of TDR data or other similar data is not a part of the invention disclosed and claimed here, but provision is made for such additional data inputs in order to broaden the scope of possible applications of the invention. The output signal from the OR gate 252 is received by the clock input terminal CLK of a flipflop 253 whose D input terminal is connected to the power supply 179. The preset and clear terminals PR and CLR, respectively, receive input signals from sources not yet discussed. The first echo detector output signal, received from the AND gate 195 illustrated in FIG. 6, and the processor enable signal SUREN are received at two inputs of an AND gate 255 whose output signal is passed to the clock input terminal CLK of each of two or more flipflops 256 and 257. The D input terminal of each flipflop 256 and 257 is connected to the power supply 179 through a resistor 258 (optional) having a resistance value of about 1 kilo-ohm, and the clear input terminal CLR of each of these flipflops is connected to the Q* output of the flipflop 253 for clearing after a packet has been analyzed. The preset input terminal PR of each of the flipflops 256 and 257 may receive an input signal from another control source, such as a TDR, that is not a part of the invention. The Q* output terminal of the flipflop 256 (optional) issues an output signal indicating that some other condition such as absence of a packet collision, is met or not met; the flipflop 257 may be deleted if no other condition is required in order to initiate timing of the interval between arrival of two packets such as BP and BP at the processor module 13.

The Q* output terminal of the flipflop 257 issues an output signal indicating that an echo packet has been received and that the processor module 13 is enabled to respond; and this output signal fed to input terminals of an AND gate 261. The AND gate 261 may also receive one or more Q* output control signals from one or more flipflops 256 indicating the presence of other conditions such as detection of an open cable or detection of a short on the cable in a TDR interrogation of the cable 12.

The output signal from the AND gate 261 is passed to the D input terminal of a flipflop 263 whose clock input terminal CLK receives a periodic clock signal from an oscillator 265 that produces an output frequency of 25 MHz and a period of length 40 nsec. The preset and clear input terminals PR and CLR of the flipflop 263 are held at predetermined voltages VPR and VCLR so that the Q and Q* output signals of the flipflop 263 are controlled by what appears at the D input terminal thereof. The Q and Q* output terminals of the flipflop 263 produce the start signal and the stop signals, respectively, for the event timer module 55, corresponding to arrival of the broadcast packet BP and of the echo pulse EP.

The output signal from the AND gate 261 is also fed to a multi-tap time delay module 275 that produces a signal with a sequence of associated time delays 5 nsec, 10 nsec, 15 nsec, . . . , 40 nsec, output signals from the time delay module 275 have delay times of 5–40 nsec and are fed to eight input terminals of an octal D-type flipflop 277. These eight input signals to the flipflop assembly 277 are inverted in order and fed to eight input terminals of a second octal D-type flipflop 279 as shown in FIG. 7. The clock input terminal of the flipflop assembly 277 receives the stop time output signal from the Q* output terminal of the flipflop 263 so that from one to eight consecutive flipflops of this assembly may have non-zero contents at the time the clock pulse is received, and these contents are issued as output signals. In a similar manner, the clock input terminal CLK of the flipflop assembly 279 receives the start time output signal from the Q-output terminal of the flipflop 263; and from one to eight consecutive input terminals of this assembly may have non-zero contents that are issued as output signals when the start time clock pulse is received. The eight output signals from the flipflop assembly 277 are received by eight input terminals of a priority encoder 281 that converts the decimal number represented by the eight input signals to a binary-coded number on three output terminals thereof. In a similar manner, the eight output terminals of the flipflop assembly 279 are received by eight input terminals of a second priority encoder 283 that issues a binary-coded output signal at three output terminals thereof. The three binary-coded output signals from each of the two priority encoders 281 and 283 are received by six input terminals of a 3×3 adder 285 having a four-bit binary output for full addition, with a fifth output terminal provided for a carry bit. The output signals from the adder 285 represent a binary-coded value corresponding to time increments of 0, 5, 10, 15, . . . , 75 nsec, which correspond to the $2^4 = 16$ possible output values of the adder 285.

The four output terminals I1, I2, I3 and I4 of the adder 285 contain all available information on the "fine" component of the time interval length $T_1$; that is, with an integer F defined by $F = 8.I4 + 4.I3 + 2.I2 + 1.I1$, the "fine" component of $T_1$ is defined by $\Delta T_1$ (fine) = F . (5 nsec) and is thus graduated in increments of 5 1 nsec. The quantity $\Delta T_1$ (fine) represents the sum of the two fragments of the time interval length $\Delta T_1$ outside the "whole" 40 nsec time intervals defined by the clock pulse source 265.

The start timer signal that issues from the flipflop 263 is also fed to a first counter enable input terminal ENP of each of two module 16 counters 291 and 293. The four input input terminals of each of the counters 291 and 293 and a second counter enable input terminal ENT of 291, are held high.

The carry out output terminal Co of the counter 291, which issues a pulse each time the counter 291 cycles from 15 to 0 modulo 16, is connected to a second counter enable terminal ENT of the second modulo 16 counter 293. The two counters 291 and 293 each receive a clock pulse from the 25 MHz. clock pulse source 265 a clock pulse every 40 nsec. The result of this is that, after the event timer module 55 has been started by arrival of the broadcast packet BP and has been stopped by arrival of the echo pulse EP, the combined output signals from the two counters 291 and 293 contain a count of the integer number C ($0 > C > 255 = 2^8 - 1$) of "whole" clock intervals, each of temporal length 40 nsec, that are contained in the time interval of length $T_1$. Otherwise expressed, $$C = \left[ \frac{\Delta T_1}{40 \text{ nsec}} \right],$$

where [x] denotes the integral part of the real number x, the largest integer that is $\leq x$. The number $\Delta T_1$ (coarse) = C.(40 nsec) is the "coarse" component of $\Delta T_1$, and the entire length $\Delta T_1$ is expressible as $$\begin{aligned}\Delta T_1 &= \Delta T_1 \text{ (coarse)} + \Delta T_1 \text{ (fine)} - \Delta t_{dp} \\ &= C.(40 \text{ nsec}) + F.(5 \text{ nsec}) - \Delta t_{dp},\end{aligned}$$

where $\Delta t_{dp}$ is the net time delay introduced by the processor module.

Various features can be added to the invention as disclosed here. As noted above, a collision detection module 51 as in FIG. 4 can be optionally included. A time domain reflectometer can be operated together with the processor module 13 to locate positions on the cable 12 where the cable impedance is substantially discontinuous, corresponding to the existence of a cable .he short, or a cable break or open, or some other malady. The invention may even include a source address identifier, of conventional design, to identify the source or station number of the station that has just broadcast the "lost" packet that has caused an echo pulse EP to be issued.

The echo pulse need not be issued during the interframe gap time interval but can be issued at other times as well. However, in such an embodiment the use of a packet collision detector as part of the processor module 13, and use of a carrier sense circuit a part of the echo module 11, is probably required as the chance of a collision with the echo packet is increased where this embodiment is used.

The invention may also be used in an embodiment in which the broadcast pulse arrives on the LAN cable 12 and the echo pulse is broadcast on a separate, dedicated cable 14 that extends from the echo module 11 to the processor module 13, as illustrated in FIG. 8. Use of a separate cable would allow deletion of all of the echo detector circuitry on the processor module. Within the processor module 13, the incoming echo pulse EP would be fed directly to the event timer module.

I claim:

1. Apparatus for determining the position of each of a plurality of transmitter-receiver stations that are connected to and communicate with each other on a bus topology cable network of such stations by broadcasting and receiving packets on the cable, where if a packet is transmitted or received by a station, the station does not broadcast a packet during an interframe time interval of predetermined length $\Delta t_{gap}$ that immediately follows transmission or receipt of the preceding packet, the apparatus comprising:

an echo module, positioned at a first end of a cable, to receive a broadcast packet, to determine whether a pulse in the packet is the last pulse received before an interframe time interval and whether at least a predetermined number of broadcast packets have been received, and if both these conditions are satisfied to broadcast an echo pulse on the cable network after a predetermined time delay $\Delta t_d$ where $\Delta t_d << \Delta t_{gap}$; and a processor module, positioned at a second end of the cable, to receive a broadcast packet, to determine the time $t_1$ at which the broadcast packet arrives at the processor module, to receive an echo pulse signal, to determine the time $t_2$ at which the echo pulse arrives at the processor module, and to determine the time interval $\Delta T_1$ required for a signal to travel from the broadcasting station to the echo module by the relation $\Delta T_1 = (t_2 - t_1 - \Delta t_{dp})/2$, where $\Delta t_{dp}$ is a net time delay associated with signal processing in the processor module.

2. Apparatus according to claim 1, wherein said echo module comprises:

a receiver-amplifier module to receive a broadcast packet as a sequence of one or more pulses, to amplify and reform each pulse as a squared pulse, and to issue this sequence of squared pulses as an output signal;

an end-of-packet detector to receive the receiver-amplifier module output signal as an input signal and to issue as an output signal a pulse of length $\Delta t_{p2}$ of a predetermined voltage $v_3$, where $\Delta t_{p2}$ is a predetermined time interval length, and, if this detector does not receive another non-zero input signal within a time interval of length $\Delta t_{p2}$ after the detector receives the immediately preceding input signal, the output signal of this detector makes a transition to a predetermined voltage $v_4$;

a packet activity and counter module to receive the output signal from the receiver-amplifier module, to count the number N of bits received in this signal, if the number of bits received is at least equal to a first predetermined number $N_1$ to issue a start-of-packet output signal of a predetermined voltage $v_5$, and if $N < N_1$ to issue a start-of-packet output signal of a predetermined voltage $v_6$;

a transmitter control module to receive the output signals from the end-of-packet detector module and from the packet activity and counter module, when these signals have voltages equal to $v_4$ and $v_5$, respectively, to issue an output signal of a predetermined voltage $v_9$ as an output signal, and when at least one of the output signals from the end-of-packet detector module or from the packet activity and counter module does not have a voltage equal to $v_4$ or $v_5$, respectively, to issue an output signal of a predetermined voltage $v_{10}$; and a transmitter module to receive the transmitter control module output signal and, when this signal has a voltage equal to $v_9$, to issue said echo pulse on said cable.

3. Apparatus according to claim 2, further comprising:

a pulse modifier module to receive said receiver-amplifier module output signal, to issue an output signal to said end-of-packet detector that is a single pulse of a predetermined voltage $v_1$ and of length equal to a predetermined time interval $\Delta t_{p1}$ if a non-zero input signal is received, and to issue an output signal of predetermined length $\Delta t_{p2}$ to said end-of-packet detector that is a substantially constant, predetermined voltage $v_2$ if no non-zero input signal is received.

4. Apparatus according to claim 3, wherein said predetermined time interval length $\Delta t_{p2}$ is greater than 200 nsec.

5. Apparatus according to claim 3, wherein said pulse modifier module comprises:

first and second signal propagation lines to receive and propagate said receiver-amplifier module output signal, where the second signal line introduces a time delay of said predetermined amount $\Delta t_{p1}$ relative to the first signal line; and first and second flipflops, each having a data input terminal and a clock input terminal, whose data input terminals are held at high voltages, with the first and second signal lines being connected to the clock input terminals of the first and second flipflops, respectively, where the Q* output terminal of the second flipflop is connected to the clear input terminal of the first flipflop, and the Q output terminal of the first flipflop issues said output signal from said pulse modifier module and is connected to the clear input terminal of the second flipflop.

6. Apparatus according to claim 3, wherein said end-of-packet detector comprises:

a delay line module having an input terminal to receive said pulse modifier module output signal and having a plurality of K consecutive time delay output terminals where AK is a positive integer, and each delay line module reproduces the input signal with a predetermined time delay $\Delta t_c$ relative to the output signal from the immediately preceding time delay output terminal, where $\Delta t_c < \Delta t_{p1}$ and $K\Delta t_c \geq t_{p2}$; and logical summing means for receiving the output signals from delay line module output terminals, for forming the logical sum of these signals and for issuing this logical sum of said output signal of said end-of-packet detector module.

7. Apparatus according to claim 3, wherein said packet activity and counter module comprises:

a monostable vibrator having a first input terminal to receive said pulse modifier module output signal, having a second input terminal and a clear input terminal connected to a high voltage source, having a Q output terminal to issue an output signal pulse of predetermined temporal length $\Delta t_\nu$ each time a pulse is received at the input terminal, and having a Q* output terminal;

a pulse counter having an input terminal connected to the Q* output terminal of the monostable vibrator and having a clock input terminal connected to receive said pulse modifier module output signal, where the pulse counter has an output terminal that issues a counter output signal that is a pulse and that resets to zero each time the counter reaches a count $N \geq N_4$, where $N_4$ is a predetermined positive number; and a flipflop, having data input and preset input terminals that are connected to a high voltage source, having a clock input terminal that receives the counter output signal, having a flipflop clear terminal that is connected to the Q output terminal of the monostable vibrator, and having a Q* output terminal that issues said start-of-packet output signal.

8. Apparatus according to claim 7, wherein said predetermined temporal length $\Delta t_\nu$ is approximately 0.8 $\mu$sec.

9. Apparatus according to claim 7, wherein said packet activity and counter module receives and counts the number M of said start-of-packet output signals of said predetermined voltage $V_5$, if M is at least equal to a second predetermined positive number $N_2$ said module resets the number M to zero and issues a packet count output signal of a predetermined voltage $V_9$, and if $M < N_2$ said module issues a packet count output signal of a predetermined voltage $V_{10}$.

10. Apparatus according to claim 9, wherein said packet activity and counter module further comprises:

a second flipflop, having data input and preset input terminals that are connected to a high voltage, having a clock input terminal that is connected to said first counter output terminal, having a clear input terminal that is connected to said Q output terminal of said monostable vibrator, and having a Q* output terminal; and a second pulse counter having a clock input terminal connected to the Q output terminal of the second flipflop and having a clear input terminal that receives a clear input signal from an external source, where the second counter has an output terminal that is connected to said data input terminal of said first flipflop and that issues a second counter output signal that is a pulse and that resets to zero each time the second counter reaches a count L, where L is a predetermined positive integer.

11. Apparatus according to claim 3, wherein said transmitter control module comprises:

a flipflop having a data input terminal to receive said packet activity and counter module output signal, having a clock input terminal to receive said end-of-packet detector output signal, and having a preset input terminal, a clear input terminal and a Q* output terminal, to issue a transmitter enable signal at the Q* output terminal;

a first monostable vibrator having a first input terminal that is grounded, having a second input terminal and a clear input terminal connected to a high voltage source, having a Q output terminal to issue an output signal pulse of predetermined temporal length $\Delta t_{\nu 1}$ each time a pulse is received at the first input terminal, and having a Q* output terminal that is connected to the clear input terminal of the flipflop;

a second monostable vibrator having a first input terminal connected to the Q output terminal of the first monostable vibrator, having a second input terminal and a clear input terminal connected to a high voltage source, and having a Q* output terminal connected to the preset input terminal of the flipflop to produce an output signal pulse of predetermined temporal length $\Delta t_{v2}$ each time a pulse is received at the first input terminal.

12. Apparatus according to claim 11, wherein said predetermined temporal length $\Delta t_{v1}$ is approximately 0.9 µsec.

13. Apparatus according to claim 11, wherein said predetermined temporal length $\Delta t_{v2}$ is at least 10 µsec.

14. Apparatus according to claim 3, wherein said transmitter module comprises:
   a transistor with its emitter grounded and its base connected to ground through a resistor and positioned to receive said transmitter control module output signal;
   a diode with its cathode connected to the transistor collector and its anode connected to said first end of said cable.

15. Apparatus according to claim 1, wherein said processor module comprises:
   a receiver-amplifier module to receive a broadcast packet as a sequence of one or more pulses, to amplify and reform each pulse as a squared pulse, and to issue this sequence of squared pulses as an output signal;
   an end-of-packet detector to receive the receiver-amplifier module output signal as an input signal, to issue as an output signal a pulse of a predetermined voltage $V_{13}$ and of length equal to a predetermined time interval $\Delta t_{p5}$, where $\Delta t_{p5}$ is a second predetermined time interval length, and, if this detector does not receive another non-zero input signal within a time interval of length $\Delta t_{p5}$ after the detector receives the immediately preceding input signal, the output signal of this detector makes a transition to a predetermined voltage $v_{14}$;
   a packet activity and counter module to receive the output signal from the receiver-amplifier module, to count the number N of bits received in this signal, if N is at least equal to a predetermined positive number $N_3$ to issue a start-of-packet output signal of a predetermined voltage $v_{15}$, and if $N < N_3$ to issue start-of-packet output signal of a predetermined voltage $v_{16}$;
   an echo detector to receive the receiver-amplifier module output signal and determine the pulse length of this signal, where, if the pulse length exceeds a predetermined length $\Delta t_{p6}$, the echo detector issues an output signal of a predetermined voltage $v_{17}$, and if the pulse length does not exceed the length $\Delta t_{p6}$, the echo detector issues an output signal of predetermined voltage $v_{18}$;
   an event timer control module to receive as input signals the output signals of the end-of-packet detector, the packet activity and counter module, the echo detector, to produce a timer control output signal of predetermined voltage $v_{21}$ if (a) the end-of-packet detector output signal for a first signal has a voltage equal to $v_{13}$ for said broadcast packet, (b) the packet activity and counter module output signal for the first signal has a voltage equal to $V_{15}$ for said broadcast packet, and (c1) the echo detector output signal for a succeeding signal has a voltage equal to $v_{18}$, and to produce a timer control output signal of predetermined voltage $v_{22}$ if conditions (a), (b) are satisfied and (c2) the echo detector output signal for the succeeding signal has a voltage equal to $V_{17}$;
   an event timer module to receive output signal from the event timer control module, to reset to zero and initiate a timer with arrival of a timer control output signal of voltage $V_{21}$, to stop the timer and determine the accumulated time $\Delta t$ indicated on the timer with arrival of a timer control output signal of voltage $V_{22}$, to stop and clear the timer if the accumulated time $\Delta t$ exceeds a predetermined time $\Delta t_{max}$, and, if $\Delta t \leq t_{max}$, to identify the accumulated time at with said time difference $t_2 - t_1$ and to determine said time $\Delta T_1$ by the relation $\Delta T_1 = (t_2 - t_1 - \Delta t_{dp})/2$.

16. Apparatus according to claim 15, further comprising:
   a pulse modifier module to receive said receiver-amplifier module output signal, to issue an output signal to said end-of-packet detector that is a single pulse of a predetermined voltage $v_{11}$ and of length equal to a predetermined time interval $\Delta t_{p4}$ if a non-zero input signal is received, and to issue an output signal to said end-of-packet detector that is a substantially constant, predetermined voltage $v_{12}$ if no non-zero input signal is received.

17. Apparatus according to claim 16, wherein said pulse modifier module comprises:
   first and second signal lines to receive and propagate said receiver-amplifier module output signal, where the second signal line introduces a time delay of predetermined amount $\Delta t_{p4}$ relative to the first signal line; and
   first and second flipflops, each having a data input terminal and a clock input terminal, whose data input terminals are held at high voltages, with the first and second signal lines being connected to the clock input terminals of the first and second flipflops, respectively, where the Q* output terminal of the second flipflop is connected to the clear input terminal of the first flipflop, and the output signal from the Q output terminal of the first flipflop is said output signal from said pulse modifier module.

18. Apparatus according to claim 16, wherein said end-of-packet detector module comprises:
   a delay line module having an input terminal to receive said pulse modifier module output signal and having a plurality of K consecutive time delay output terminals where K is a positive integer, and each delay line module reproduces the input signal with a predetermined time delay $\Delta t_c$ relative to the output signal from the immediately preceding time delay output terminal, where $\Delta t_c < \Delta t_{p4}$ and $K\Delta t_c \leq \Delta t_{p5}$;
   logical summing means for the output signals from delay line module output terminals, for forming the logical sum of these signals and for issuing this logical sum of said output signal as a first end-of-packet detector module.

19. Apparatus according to claim 18, wherein said end-of-packet detector module further comprises:
   a flipflop having a clock input terminal that receives said first end-of-packet detector module output signal;
   a first monostable vibrator having a first input terminal that is connected to the Q output terminal of the flipflop, having second input and clear input terminals that are connected to a high voltage source, and having a Q* output terminal that produces an output signal pulse of predetermined temporal length $\Delta t_{v1}$ that is received by the clear input terminal of the flipflop;

a second monostable vibrator having a first input terminal that is grounded, having a second input terminal that is connected to the Q* output terminal of the first vibrator, and having a clear input terminal that is connected to a high voltage source, and having a Q* output terminal that is connected to the preset input terminal of the flipflop and that produces an output signal pulse of predetermined temporal length $\Delta t_{v2}$;

where the flipflop has a Q* output terminal that issues a second end-of-packet detector module output signal.

20. Apparatus according to claim 16, wherein said packet activity and counter module comprises:

a monostable vibrator having a first input terminal to receive said pulse modifier module output signal, having second and third input terminals that are connected to a high voltage source, having a Q output terminal to issue an output signal pulse of predetermined temporal length $\Delta t_v$ each time a pulse is received at the input terminal, and having a Q* output terminal;

a pulse counter having an input terminal connected to the Q* output terminal of the monostable vibrator and having a clock input terminal connected to receive said pulse modifier module output signal, where the counter has an output terminal that issues a counter output signal that is a pulse and resets each time the counter reaches a count K, where K is a predetermined positive integer; and a flipflop, having a flipflop preset terminal and a D input terminal that are held at a high voltage, having a clock input terminal that receives the counter output signal, and having a flipflop clear terminal that is connected to the Q output terminal of the monostable vibrator, where the output signal issued by the Q* output terminal of the second flipflop is said start-of-packet output signal.

21. Apparatus according to claim 16, further comprising a collision detector that has an input terminal connected to said second end of said cable, that has an output terminal connected to an input terminal of said event timer control module, that produces an output signal of predetermined voltage $V_{23}$ if the collision detector detects a collision of two or more signals on said cable, and that produces an output signal of predetermined voltage $V_{24}$ if the collision detector does not detect a collision of two or more signals on said cable.

22. A method for determining the position of each of a plurality of broadcasting stations that are connected to and communicate with each other on a bus topology cable network of such stations by broadcasting and receiving packets on the cable, where if a packet is transmitted or received by a station, the station does not broadcast a packet during an interframe time interval of predetermined length $\Delta t_{gap}$ that immediately follows transmission or receipt of the preceding packet, the method comprising the steps of:

providing an echo module, positioned at a first end of a cable, to receive a broadcast packet, to determine whether the broadcast packet is the last packet received before an inter frame time interval and whether at least a predetermined number of broadcast packets have been received, and if both these conditions are satisfied to broadcast an echo packet on the cable network after a predetermined time delay $\Delta t_d$, where $\Delta t_d << \Delta t_{gap}$;

providing a processor module, positioned at a second end of the cable, to receive a broadcast packet, to determine the time $t_1$ at which the broadcast packet arrives at the processor module, to receive an echo packet signal and to determine the time $t_2$ at which the echo packet arrives at the processor module, and to determine the time interval $\Delta T_1$ required for a packet to travel from the broadcasting station to the echo module by the relation $\Delta T_1 = (t_2 - t_1 - \Delta t_{dp})/2$ where $\Delta t_{dp}$ is a net time delay associated with signal processing in the processor module.

23. A method for determining the position of each of a plurality of broadcasting stations that are connected to and communicate with each other on a bus topology network of such stations, the method comprising the steps of: providing an echo module, positioned at a first end of a cable, to receive a broadcast packet, to determine whether the broadcast packet is the last packet received before an interframe time interval and whether at least a predetermined number of broadcast packets have been received, and if both these conditions are satisfied to broadcast an echo packet on the cable network after a predetermined time delay $\Delta t_d$;

providing a processor module, positioned at a second end of the cable, to receive a broadcast packet, to determine the time $t_1$ at which the broadcast packet arrives at the processor module, to receive an echo packet signal and to determine the time $t_2$ at which the echo packet arrives at the processor module, and to determine the time interval $\Delta T_1$ required for a packet to travel from the broadcasting station to the echo module by the relation $\Delta T_1 = (t_2 - t_1 - \Delta t_{dp})/2$ where $\Delta t_{dp}$ is a net time delay associated with signal processing in the processor module.

24. A method for determining the position of each of a plurality of broadcasting stations that are connected to and communicate with each other on a bus topology cable network of such stations by broadcasting and receiving packets on the cable, where if a packet is transmitted or received by a station, the station does not broadcast a packet during an interframe time interval of predetermined length $\Delta t_{gap}$ that immediately follows transmission or receipt of the preceding packet, the method comprising the steps of:

providing an echo module, positioned at a first end of a cable, to receive a broadcast packet, to determine whether the broadcast packet is the last packet received before an inter frame time interval and whether at least a predetermined number of broadcast packets have been received, and if both these conditions are satisfied to broadcast an echo packet on an echo communication line after a predetermined time delay $\Delta t_d$, where $\Delta t_d << \Delta t_{gap}$;

providing a processor module, positioned at a second end of the cable, to receive a broadcast packet, to determine the time $t_1$, including a time delay $\Delta t_{dp}$ for identification of an echo packet, at which the broadcast packet arrives at the processor module, to receive an echo packet signal and to determine the time $t_2$ at which the echo packet on the echo communication line arrives at the processor module, and to determine the time interval $\Delta T_1$ required for a packet to travel from the broadcasting station to the echo module by the relation $\Delta T_1 = (t_2 - t_1 - \Delta t_{dp})/2$ where $\Delta t_{dp}$ is a net time delay associated with signal processing in the processor module; and providing an echo communication line that is separate from the cable and connects the echo module and the processor module, to transport an echo packet from the echo module to the processor module.

25. A method for determining the position of each of a plurality of broadcasting stations that are connected to and communicate with each other on a bus topology network of such stations, the method comprising the steps of:

providing an echo module, positioned at a first end of a cable, to receive a broadcast packet, to determine whether the broadcast packet is the last packet received before an interframe time interval and whether at least a predetermined number of broadcast packets have been received, and if both these conditions are satisfied to broadcast an echo packet on an echo communication line after a predetermined time delay;

providing a processor module, positioned at a second end of the cable, to receive a broadcast packet, to determine the time $t_1$ at which the broadcast packet arrives at the processor module, to receive an echo packet signal and to determine the time $t_2$ at which the echo packet arrives on the echo communication line at the processor module, and to determine the time interval $\Delta T_1$ required for a packet to travel from the broadcasting station to the echo module by the relation $\Delta T_1 = (t_2 - t_1 - \Delta t_{dp})/2$ where $\Delta t_{dp}$ is a net time delay associated with signal processing in the processor module; and providing an echo communication line that is separate from the cable and connects the echo module and the processor module, to transport an echo packet from the echo module to the processor module.

* * * * *